Feb. 14, 1967  E. S. LA RUE ETAL  3,303,543
DETACHABLE FASTENER
Filed July 31, 1964
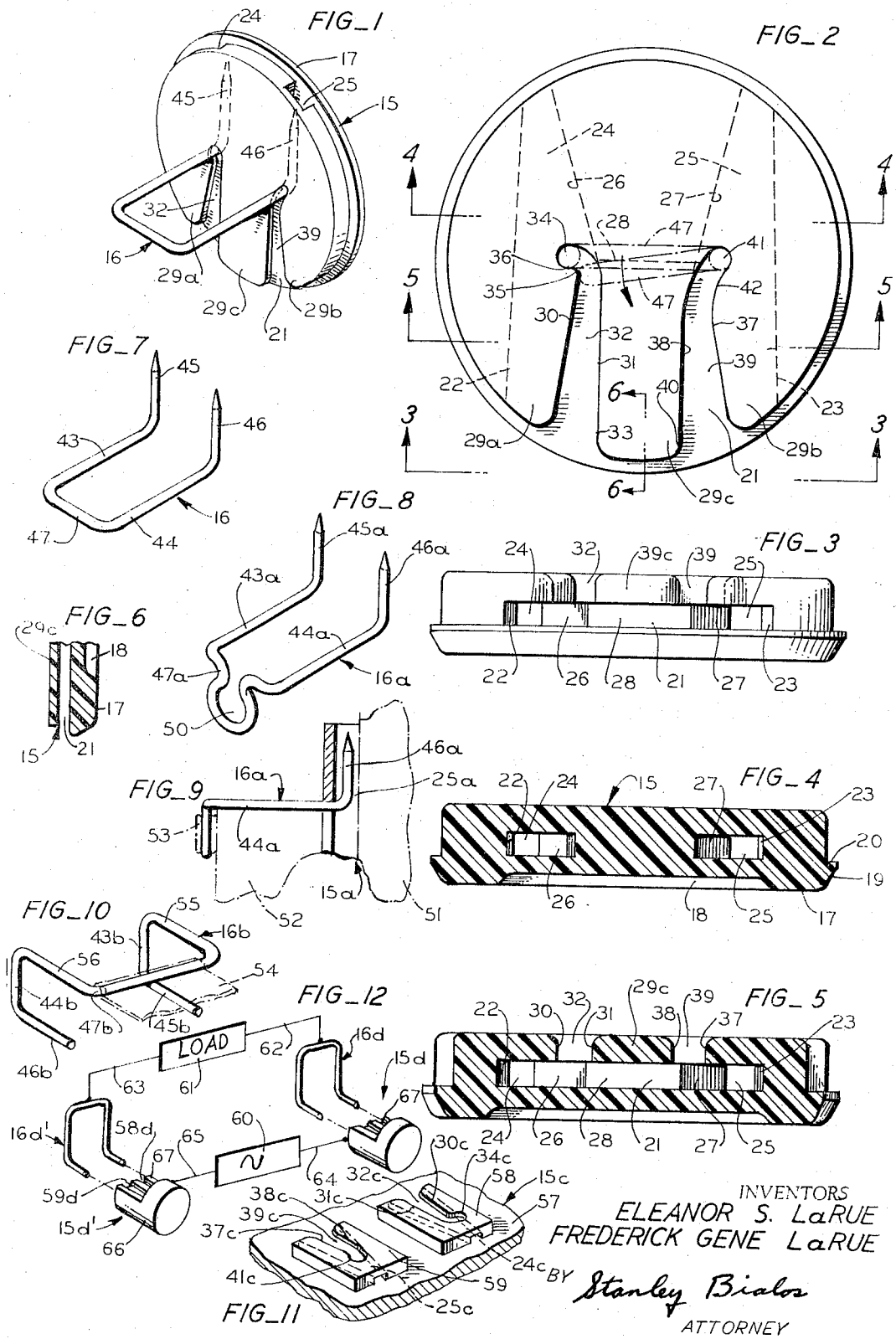
INVENTORS
ELEANOR S. LaRUE
FREDERICK GENE LaRUE
BY Stanley Bialos
ATTORNEY

United States Patent Office 3,303,543
Patented Feb. 14, 1967

3,303,543
DETACHABLE FASTENER
Eleanor S. La Rue, 418 18th Ave., San Francisco, Calif. 94121, and Frederick Gene La Rue, Ukiah, Calif., assignors to said Eleanor S. La Rue
Filed July 31, 1964, Ser. No. 386,629
14 Claims. (Cl. 24—104)

This invention relates to a fastener structure and, more particularly, to a detachable or releasable fastener comprising a pair of separable elements. Such detachable fastener has utility in a variety of environments as, for example, for removable buttons used with wearing apparel such as women's blouses, for items of jewelry such as earrings wherein the decorative component thereof is secured to one of the fastener elements and the clamp component is secured to the other such element, as a flexible coupling that affords relative movement between a pair of components, and as an electrical connector in which such fastener is interposed in a circuit conductor so that the interconnection of one releasable element with the other establishes the circuit therethrough.

Detachable fasteners of the general type being considered have been proposed heretofore, and an exemplary instance thereof is the fastener structure disclosed in our Patent No. Re. 25,004. In this prior patent, the detachable fastener comprises a female element provided with an opening communicating with a pair of restricted passages adapted to slidably receive the legs of a male element therein. The legs of such male element are resiliently biased outwardly into spaced apart relation, and in one embodiment of the invention disclosed in such patent, the orientation and spacing of the passages are such that a stress is applied to the legs when located therein sufficient to resist their removal. In another embodiment, each of the passages is provided therealong with a laterally off-set notch into which the legs are respectively urged by the resilient biasing force defined therebetween by the male element, and the interlock thereby established between the legs and the notches resists separation of the two fastener elements.

The present invention constitutes an improvement over the detachable fastener structure disclosed in such prior patent. In this connection, the improvement results in a general sense in a detachable fastener in which the two separable components thereof are more readily united and separated than in our prior fastener structures, and the provision of a fastener having such advantages is one of the objects of this invention.

Additional objects, among others, are: the provision of a detachable fastener of the type described in which the opening in the female element is in the nature of an open ended channel rather than a perimetrically closed recess so that precise alignment and positioning of the two elements are not critical in inserting the male element into such opening; that of providing the male element with laterally turned free end portions or feet, and in which the female opening includes a pair of spaced apart passages extending from the main body thereof that are relatively wide in lateral direction and thereby obviate high-value frictional engagement of such laterally turned free end portions of the legs with the side walls of such passages upon insertion of the leg end portions thereinto; and to provide a pair of guide channels associated with such opening, one of which is provided with a laterally off-set notch and the other with a laterally off-set recess and cam surface therefor, the male fastener element being releasably interconnected with the female element upon inward displacement longitudinally of the opening which compresses the legs toward each other until they respectively snap into place within the notch and recess, and the male component being releasable from the opening by applying a torque or twisting force tending to rotate the male element generally about the axis of the leg thereof disposed within the aforementioned recess whereupon the opposite leg is displaced from the notch and the male component can then be removed from the opening by withdrawal along the longitudinal axis thereof—the recess-located leg being cammed outwardly from the recess as a part of the withdrawal motion.

Further objects and advantages of the invention will become apparent as the specification develops.

Embodiments of the invention are illustrated in the accompanying drawing in which:

FIGURE 1 is a perspective view of a detachable fastener structure embodying the invention, the illustrated fastener being especially useful as with a removable button;

FIGURE 2 is a bottom plan view of the female element of the fastener, various positions of the male element relative thereto being illustrated in phantom;

FIGURE 3 is a front view in elevation taken along the plane 3—3 of FIGURE 2;

FIGURE 4 is a transverse sectional view taken along the line 4—4 of FIGURE 2;

FIGURE 5 is a transverse sectional view taken along the line 5—5 of FIGURE 2;

FIGURE 6 is a broken longitudinal sectional view taken along the line 6—6 of FIGURE 2;

FIGURE 7 is a perspective view of the male element illustrated in FIGURE 1;

FIGURE 8 is a perspective view of a modified male element;

FIGURE 9 is a broken longitudinal sectional view of the male component shown in FIGURE 8 and illustrated in association with a female element therefor, the two elements of the fastener being respectively shown in association with other structure which, for example, might be the clamp and ornamentation components of an earring;

FIGURE 10 is a perspective view of a further modified male element particularly useful in environments wherein a load is applied thereto generally in the direction in which the free end portions of the spaced legs extend as, for example, where the fastener structure is used in securing a watch band to the case of a wrist watch;

FIGURE 11 is a broken perspective view of a modified female element shown in association with a support structure therefor; and FIGURE 12 is a broken perspective view in somewhat diagrammatic form illustrating the use of fastener structure embodying the invention as an electrical connector.

The detachable fastener structure embodying the present invention essentially comprises two elements, a female element 15 and a male element 16. In certain instances, the fastener might be devoid of other structural components as is the case of the embodiment illustrated in FIGURE 1 in which the female element 15 may serve as a button for wearing apparel, such as a woman's blouse, and the male element releasably attaches the button to the article of clothing. In this event, and if desired, the face 17 of the female element may be colored, configurated, or otherwise decorated so as to provide an asthetic appearance. One or both of the elements 15 and 16, however, may be used in association with other components, as will be described hereinafter.

The size of the detachable fastener structure is not critical, and whether it is relatively large or small will depend upon the use intended therefor. Similarly, the material or materials from which the fastener is made is not critical except that the male element 16, if an integral component, should be resilient so that the spaced legs thereof can be displaced from their normal position and the resilient biasing force defined therebetween will tend to restore the legs to such normal condition. For this reason, it is usually convenient to form the male element from steel spring wire although other metals may be used as well as other materials such as certain synthetic resin plastics having the requisite resiliency. The female element 15 may be an integral element or comprised of a plurality of parts; and in the event of such element being plastic, as in the case of the embodiment shown in FIGURES 1 through 5, inclusive, it may be a unitary element formed in a conventional molding operation. By way of example, a suitable synthetic resin plastic material which may be used is polyethylene, and another is polystyrene, preferably of a high density grade, and in either instance, an injection molding operation can be employed.

The female element 15 shown in FIGURES 1 through 5 is an integral or unitary member, the face 17 of which may be planar or off-set centrally as shown at 18 for decorative purposes, or otherwise configurated. Correspondingly, the annular edge 19 of the element inclines outwardly and terminates in a lip or flange 20 that improves the general appearance of the article.

The element 15 is provided therein with a relatively wide opening 21 extending between spaced apart longitudinal side walls 22 and 23. The opening 21 terminates in a pair of spaced apart passage portions 24 and 25, the first of which is defined in part by the side wall 22, and the second by the side wall 23. Each of the passages 24 and 25 has an inner generally longitudinally extending wall portion that is angularly disposed relatively to the respectively associated side walls 22 and 23, and such angularly disposed wall portions are respectively denoted 26 and 27. The inclined walls 26 and 27 terminate at their inner ends in a transversely disposed wall 28 located approximately in the center of the element 15.

The opening 21 and passages 24 and 25 extending from the main body thereof are at least partially closed along their upper edges by overhanging closure wall portions respectively designated with the numerals 29a, 29b and 29c. Quite evidently, as shown best in FIGURE 2, the wall portion 29a is associated with the passage 24 and also partially overhangs that portion of the main body of the opening 21 disposed along the wall 22; the wall portion 29b is associated with the passage 25 and also partially overhangs that portion of the main body of the opening 21 disposed along the wall 23; and the wall portion 29c is centrally disposed with respect to the opening 21 and forms a tongue that is oriented along the longitudinal axis of such opening.

The wall portions 29a and 29c respectively provide facing edges 30 and 31 that define a channel or slot 32 therebetween, and such edges converge inwardly from a relatively wide mouth 33 to a restricted inner end which is closed and provides a laterally off-set notch 34. The mergence of the notch 34 with the edge portion 30 defines a shoulder 35 which is quite sharp, whereupon a relatively flat edge portion 36 is provided which forms a constraining member tending to maintain the leg of the male element 16 within the notch 34 which thereby prevents inadvertent displacement of the male element 16 from the female element 15, as will be described in detail hereinafter.

In a substantially similar manner, the wall portions 29b and 29c respectively provide facing edges 37 and 38 that define a channel or slot 39 therebetween, and such edges converge inwardly from a relatively wide mouth 40 to a restricted inner end which is closed and provides a laterally off-set recess 41. The mergence of the recess 41 with the edge portion 37 defines a cam surface 42 which is utilized particularly in removing the male element 16 from the female element 15, as will be described hereinafter.

The male element 16 has a somewhat U-shaped configuration and provides a pair of spaced apart legs 43 and 44 that respectively terminate in free end portions 45 and 46 which are angularly disposed relative to the axes of the legs 43 and 44, and are substantially normal thereto in the specific illustration. In the event that the fastener is to be used with an article of clothing and the male element 16 intended to pierce the fabric thereof, it is preferable to point or sharpen the extremities of the free end portions, as shown in FIGURE 7, to facilitate penetration of the fabric. The legs 43 and 44 are integrally connected at their opposite ends by a base or cross-member 47. Quite apparently, the element 16 as shown is a unitary member, and in this event, it is formed of a material which resiliently biases the legs 43 and 44 into the spaced apart relationship illustrated, but permits such legs to be displaced therefrom against the force of such resilient bias.

In use of the fastener structure, and considering at this point only the cooperative interrelationship of the male element 16 with the female element 15, when it is desired to interconnect the two elements, they are brought into adjacency with the laterally turned free end portions or feet 45 and 46 of the element 16 oriented in alignment with the wide mouth of the opening 21. The element 16 is then moved inwardly into such opening and is automatically brought into proper position relative to the element 15 by the cooperative interrelation of the spaced legs 43 and 44 of the element 16 with the respectively associated edge portions 30–31 and 37–38 of the channels 32 and 39. In this sense, the respectively associated edges of the channels converge inwardly and thereby guide the element 16 into movement along a path the axis of which is substantially coincident with the longitudinal axis of the opening 21 and of the tongue 29c which overhangs the center portion of such opening.

Once the element 16 is moving appropriately through the channels 32 and 39, the respective inwardly converging edges 30 and 37 thereof displace the legs 43 and 44 of the element 16 inwardly against the resilient biasing force that tends to maintain such legs in the spaced apart condition thereof shown in FIGURE 7. As soon as the male element approaches the inner end portion of the channels 32 and 39 (such inner end portion being generally adjacent the transversely disposed wall 28), the leg 44 is progressively displaced outwardly toward its normal position by the resilient biasing force operative thereon because it is then transversing the smoothly curved surface of the cam 42. Consequently, the leg 44 is first displaced inwardly by the inwardly inclined edge 37 of the channel 39, and is then permitted to be incrementally displaced outwardly because of the outward curvature of the cam surface 42. The cam surface terminates at its inner end in the recess 41, and the resilient biasing force operative upon the leg urges it ultimately into the recess 41.

The leg 43, however, continues to be forced inwardly as it approaches the inner end of the channel 32 by the inwardly inclined edge 30 thereof until a sufficient mass of the leg travels past the sharply angled shoulder 35 at which time the leg snaps laterally outwardly and into the notch 34 as a consequence of the resiliently biasing force operative upon the leg.

The distance between the outer lateral surfaces of the notch 34 and recess 41 is slightly less than the corresponding distance between the outer surfaces of the legs 43 and 44 in the unstressed condition shown in FIGURE 7. Therefore, the biasing force defined between the legs 43 and 44 urges them outwardly and into the tight abutment with such outer surfaces of the notch 34 and recess 41. A sloppy fit between the two elements is thereby obviated, and a positive force tends to retain the two elements in their interconnected state. The legs 43 and 44 of the element 16 are respectively constrained within the notch 34 and recess 41 against longitudinal displacements in either direction primarily because the leg 43 is effectively confined between the flat edge portion 36 adjacent the shoulder 35 and notch 34 and the opposite edge portion of the notch and, secondarily, because displacements of the leg 44 are effectively resisted in one longitudinal direction by the cam surface 42 and in the opposite longitudinal direction by the facing edge portion of the recess 41.

When it is desired to release and remove the element 16 from the element 15, a twisting force or torque is applied to the element 16 tending to rotate the same in a counterclockwise direction, as indicated by the arrow in FIGURE 2, about the longitudinal axis of the leg 44, which axis is essentially coincident with an axis through the center of the recess 41 and normally disposed relative to the plane of the element 15. This angular twisting force causes the leg 43 of the element 16 to move inwardly along the flattened edge portion 36 and finally over the shoulder 35, at which time the base or cross-member 47 of the element 16 has been shifted from the position illustrated by dot and dash lines in FIGURE 2, into the position shown by dash lines. Thereafter, the element 16 may be readily withdrawn from the opening 21 by simply moving the element outwardly along the longitudinal axis of the female element 15. During such withdrawal, the cam surface 42 first smoothly cams the leg 44 of the male element inwardly after which the leg slides along the edge 37 of the channel 39.

The opening 25 is quite large in lateral dimension and is substantially wider than the normal spacing between the feet or free end portions 45 and 46 of the element 16. Therefore, it is not essential that such free end portions be carefully aligned with the element 15 prior to insertion into the opening thereof as would be the case if the opening were restricted as, for example, if the opening comprised two individual openings such as those adjacent the opposite end thereof—i.e., the opposite ends of the passages 24 and 25. To further facilitate ready insertion of the element 16, the entrances into the channels 32 and 39 are relatively wide and are defined by curved edge portions over which the legs 43 and 44 of the element 16 are readily removable. Such curved entrance edges serve to guide the legs into proper position for displacement thereof along the channels.

The passages 24 and 25 which form a part of the opening 21 and extend longitudinally from the central body portion thereof are quite large in lateral dimension adjacent their inner ends and then reduce in width toward their opposite ends because of the outwardly inclined wall portions 26 and 27. Depending on the length of the feet or free end portions 45 and 46 of the element 16, the feet may engage such inclined wall portions 26 and 27, which is usually the case. When engagement occurs upon insertion of the element 16, the feet 45 and 46 are progressively spread outwardly as they slide along the surface portions 26 and 27. However, in that the legs 43 and 44 cannot move outwardly with the feet as they are spread (the legs are in abutment with the edges 30 and 37 of the channels 32 and 39), a twisting force or torque is imparted to the feet which causes them to twistingly rotate about the longitudinal axes of the respectively associated legs 43 and 44. Consequently, the feet are maintained in a condition of stress when the element 16 is completely inserted into the element 15 with the legs 33 and 34 respectively disposed within the notch 34 and recess 41, and such stress urges the legs outwardly and thereby augments the biasing force then operative upon the legs in the same direction to positively seat and thereafter maintain the legs in the respectively associated notch 34 and recess 41.

Those sections of the wall portions 29a and 29b which respectively overhang or cover the passages 24 and 25 are adapted to prevent displacement of the element 16 in an upward direction, as viewed in FIGURE 2. If the element 16 were not so constrained against movement in a direction substantially normal to the plane of the element 15, the legs 43 and 44 could be withdrawn readily from the notch 34 and recess 41 and separation of the two elements thereby effected. The presence of such covering wall portions prevents withdrawal of the element 16 by movement thereof in the upward direction and, correspondingly, the underlying surface of the element 15 prevents downward movement of the element 16. The covering wall portions also prevent pivotal movement of the element 16 about the mergence of the legs and associated feet thereof which also could result in separation of the two fastener elements.

The fastener structure defined by the elements 15 and 16 may be used directly as a button for an article of wearing apparel and, in this event, the female element 15 forms the head of such button and is intended to be inserted through a buttonhole appropriately provided by such garment. The button is directly secured to the garment by pushing the feet 45 and 46 of the male element 16 through the garment material, and to facilitate penetration of the material, the tips of the feet are pointed, as shown best in FIGURE 7. Thus, to secure the button to an article of clothing, the elements 15 and 16 are separated and the element 16 is pushed through the garment. After the feet 45 and 46 have passed therethrough, they are inserted into the opening 21 and the elements 15 and 16 then interconnected as heretofore described. To remove the button from such garment, the elements 15 and 16 are separated in the manner described herein, and the element 16 may be withdrawn from the garment.

A modified form of the invention is illustrated in FIGURES 8 and 9 and constitutes a slight alteration in the male element of the fastener structure. More particularly, such alteration is concerned with the base or cross-member of this element which is otherwise structurally and functionally similar to the element 16 heretofore described. Therefore, the same numerals are employed in FIGURES 8 and 9 to identify respectively corresponding components or parts of the fastener structure, except that the suffix a has been added to each such number.

Accordingly, the male element 16a has a pair of spaced apart legs 43a and 44a respectively equipped with laterally turned feet or free end portions 45a and 46a. The base or cross-member 47a of the male element is deformed downwardly in a direction opposite to that of the feet 45a and 46a, and is turned intermediate the ends thereof so as to define an eye 50.

The male element 16a cooperates with a female element 15a precisely as in the prior embodiment. However, instead of the fastener structure being used directly as a button for an article of wearing apparel, it is used to connect two individual components 51 and 52, the first of which is affixed to the element 15a, and the second to the element 16a. As a specific example, the components 51 and 52 may form an earring and in this event, the component 51 is the decorative or ornamental face of the earring and it is adhesively secured or otherwise bonded to the outer surface of the element 15a. In the specific form shown, the outer surface of the element 15a is substantially planar and does not have the off-set central portion 18 as in the prior embodiment. This, however, is not essential. The element 15a and component 51 could be integral rather than separate members secured together.

The component 52 is equipped with a boss or post 53 extending outwardly from one side thereof, and such post projects through the eye 50 of the cross-member 47a of the male component. The cooperative interconnection of the eye 50 and post 53 fixedly connects the element 16a with the component 52 which, in the case of an earring structure, defines the clamp element thereof. The screw-equipped clamping end portion of the clamp component 52 has been omitted in the drawing for purposes of simplicity.

The modified fastener structure shown in FIGURES 8 and 9 functions in precisely the same manner as the fastener structure heretofore described. For this reason, further description in detail is unnecessary. The modified fastener structure has the advantage of permitting a variety of decorative earring components 51 to be used interchangeably with a single clamping component 52. For such interchangeability, each decorative component 51 will be equipped with a female element 15a to permit read interconnection and separation with the male element 16a carried by the earring clamp component 52.

A further modification of the invention is illustrated in FIGURE 10, and resides completely in the male element. Again, the same numerals are employed to identify respectively corresponding parts except that the suffix b is used therewith. This form of element is particularly useful where force loadings are applied to the male element of a magnitude and direction that might tend to separate the two elements of the fastener structure in the forms thereof heretofore shown and described. For example, the fastener structure shown in FIGURE 10 might be employed to connect a watch band to the case of a wrist watch, and to illustrate such use, a watch band 54 is illustrated in phantom in FIGURE 10.

The watch band 54 has the usual closed loop at its inner end, and the base or cross-member 47b of the male element 16b passes therethrough. The spaced legs 43b and 44b of such element are turned laterally intermediate the ends thereof, as shown at 55 and 56, and are again turned upon themselves to form feet or free end portions 45b and 46b. The feet are disposed in substantially parallel relation with the respectively associated leg sections 55 and 56; and, therefore, each of the legs in its entirety has a generally U-shaped configuration.

The element 16b is intended for use with a female component which may have all of the essential structural and functional characteristics of the element 15 heretofore described. Therefore, the feet 45b and 46b will be inserted into the opening 21 of such element 15, for example, and the legs 43b and 44b will pass through the channels 32 and 39 thereof and into the associated notch 34 and recess 41 to effect interconnection of the two elements. Separation thereof will be brought about by first rotating the element 16b relative to the female element, as heretofore described. Evidently, such female element will be provided by the case of such watch either integrally therewith or suitably secured thereto.

Yet another modification of the invention is shown in FIGURE 11 and it resides in particular in the female element of the fastener structure. However, in that such modified female element is generally similar to element 15, the same numerals with the suffix c added thereto are used to denote respectively corresponding parts. The element 15c shown in FIGURE 11 comprises a support structure 57 which, in the usual case, is relatively rigid and may be formed of any suitable material, metal or plastic for example. Fixedly secured to the component 57, as by adhesive, are a pair of segments 58 and 59, the first of which has spaced apart edge portions 30c and 31c that define a channel 32c therebetween. The channel 32c terminates in a notch 34. The segment 59 has a pair of spaced apart edge portions 37c and 38c that define a channel 39c therebetween which terminates in a recesss 41c. The channels 32c and 39c respectively overlie openings that comprise as a part thereof, passages 24c and 25c.

The fastener element 15c is adapted to cooperate with any of the male elements heretofore described and in establishing a releasable interconnection therewith, the spaced legs of such elements are guided through the channels 32c and 39c and are automatically displaced outwardly by the resilient biasing force defined by the male element to respectively insert such legs into the notch 34c and recess 41c. Thus, an interconnection is thereby established between the two elements which is then maintained until the elements are separated by twisting the male element relative to the female element 15c and thereafter withdrawing the male element, all as heretofore described.

A still further embodiment of the invention is illustrated in FIGURE 12 and in this embodiment, the fastener structure is used as an electrical connector. In the form shown, two identical fastener structures are used in establishing an electrical circuit which includes a generator or other voltage source 60 (a 115 v. A.C. convenience outlet, for example) and a load 61. Conductors 62 and 63 from the load 61 are respectively connected to male elements 16d and 16d' which are identical and each may be precisely the same as the element 16 heretofore described. Evidently, the elements 16d and 16d' are necessarily conductive, and in the usual case, will be formed of spring steel coated with one of the good conductive metals usually employed in connectors for this purpose, such as copper, silver, etc.

The power source 60 is similarly connected by conductors 64 and 65 to a pair of female elements 15d and 15d' adapted to respectively cooperate with the elements 16d and 16d'. In the particular form shown, the two female elements are identical and considering one thereof for descriptive purposes, it comprises a barrel 66 formed of a material having good dielectric properties or, if formed of a conductive material, will be suitably encased in or supported by such a dielectric material. Considering the case of the barrel 66 being an insulator, some portion of the female element in engagement with the associated male element must be a conductor and the associated lead to the power source 60 must be connected thereto.

The embodiment of the invention shown in FIGURE 11 is particularly suited for use with the arrangement shown in FIGURE 12 and, in this connection, the barrel 66 may have an off-set platform 67 which corresponds generally to the surface of the support structure 57, shown in FIGURE 11. Mounted on such platform 67 are segments 58d and 59d which may be the same as the segments 58 and 59, heretofore described. At least one of the segments 58d and 59d is formed of a good conductive material such as copper, etc., and the conductor leading to the power source 60 is connected thereto. Such segments may be wholly contained within the dimensional limits of the platform 67, or they may project therebeyond such as into the body of the barrel. In this latter event, such body could form the closure walls overhanging the passages (24c and 25c in the FIGURE 11 embodiment) which cooperate with the feet of the male elements to confine the same within such passages.

In all of the embodiments of the invention, the detachable fastener structure comprises male and female elements which are releasably interconnectable. In this respect, the female element includes a large opening and a pair of guide channels respectively terminating in a laterally off-set notch and laterally off-set recess. The notch communicates with its associated passage over a sharply defined shoulder, and the recess communicates with its associated passage through a cam surface. The male element includes a pair of legs resiliently biased in spaced apart relation and equipped adjacent the ends thereof with laterally turned feet. In connecting the two elements, the spaced legs are advanced through the guide channels and are urged inwardly against the biasing force defined between the legs until they come into alignment with the notch and recess, whereupon such biasing force displaces the legs thereinto. When in this position, the male element is constrained against displacements relative to the female element in each longitudinal direction by the confining edges of the notch and recess; and the male element is further constrained against rocking motions about the mergence of the spaced legs with their laterally turned feet, and also against movements in directions generally normal to a plane defined by such channels, by wall elements which underlie and overlie at least those portions of the opening which receive such feet therein. Any stressing of the feet further tends to anchor the male element within the female element. Nevertheless, the male element is quickly and easily separated from the female element by applying a slight twisting force to the male element which tends to rotate the same in a predetermined direction (counter-clockwise as viewed in FIGURE 2) about an axis extending through the leg-receiving recess in the female element because such twisting force springs from the leg-receiving notch of the female element the leg previously constrained therewithin, whereupon a slight linear force applied between the two elements tending to separate the same longitudinally is then sufficient to effect such separation thereof. A twisting force applied to the male element in the opposite direction is ineffective to release the same for withdrawal thereof and a twisting force applied to the male element tending to rotate the same in either direction about an axis through the notch in the female element is also ineffective to release the male element for withdrawal thereof.

While in the foregoing specification embodiments of the invention have been described in considerable detail for purposes of making an adequate disclosure thereof, it will be apparent to those skilled in the art that numerous changes can be made in such details without departing from the spirit and principles of the invention.

What is claimed is:

1. A detachable fastener comprising: a male element having a pair of legs resiliently urged by a biasing force into spaced apart relation and being displaceable relative to each other against such biasing force, and a female element provided with a longitudinally extending opening and provided also with a pair of surfaces extending generally lengthwise of said opening, said surfaces being adapted to have the legs of said male element respectively move therealong and being oriented relative to each other so as to displace said legs laterally against such biasing force, one of said surfaces having a notch therealong adapted to seat one of said legs therein, said notch being off-set laterally from the general line of said one surface in a direction in which such biasing force urges said one leg thereinto, the other of said surfaces having a recess therealong adapted to seat the other of said legs therein at the same time that said one leg is seated within said notch, such resilient biasing force being operative upon movement of said legs along said surfaces to cause said one leg to resiliently snap into said notch and said other leg to enter said recess and thereby releasably interlock said male and female elements against relative longitudinal displacements, said male element being removable from such condition of interlock by the application of a torque thereto tending to rotate the same about the longitudinal axis of the other of said legs while in said recess and thereby displace said one leg from said notch, said notch being the only notch provided by said female element cooperative with said male element to establish a releasable interlock therebetween.

2. A detachable fastener comprising: a male element having a pair of legs resiliently urged by a biasing force into spaced apart relation and being displaceable relative to each other against such biasing force, and a female element provided with a longitudinally extending opening and provided also with a pair of surfaces extending generally lengthwise of said opening, said surfaces being adapted to have the legs of said male element respectively move therealong and being oriented relative to each other so as to displace said legs laterally against such biasing force, one of said surfaces having a notch therealong adapted to seat one of said legs therein, said notch being off-set laterally from the general line of said one surface in a direction in which such biasing force urges said one leg thereinto, the other of said surfaces having a recess therealong adapted to seat the other of said legs therein at the same time that said one leg is seated within said notch and being off-set laterally from the general line of the associated surface in a direction in which such biasing force urges said other leg thereinto, said other surface also being provided with a cam configuration therealong defining the mergence thereof with said recess, and which cam configuration is traversed by said other leg in moving into said recess and tends to maintain such other leg therein, the aforementioned resilient biasing force being operative upon movement of said legs along said surfaces to cause said one leg to resiliently snap into said notch and thereby releasably interlock said male and female elements against relative longitudinal displacements, said male element being removable from such condition of interlock by application of a torque thereto tending to rotate the same about the longitudinal axis of the aforesaid other leg and thereby displace said one leg from said notch.

3. The detachable fastener of claim 2 in which said surfaces are spaced from each other laterally, and in which said female element has a longitudinally extending tongue located intermediate said surfaces and providing edge portions respectively facing the same, each surface together with the associated facing edge portion defining a channel therebetween through which a leg of said male element is movable, said channels having enlarged mouths defining the entrances thereto and being closed at their inner ends and respectively providing thereat the associated notch and recess.

4. The detachable fastener of claim 2 in which said surfaces are spaced from each other laterally, in which said legs are inwardly displaceable toward each other against the biasing force operative thereon, and in which said notch and recess are disposed laterally outwardly from the respectively associate surfaces, said surfaces being oriented to displace said legs toward each other upon movement thereof through the respective channels inwardly from the entrances thereof.

5. A detachable fastener comprising: a male element having a pair of legs at least one of which terminates in an angularly extending free end portion defining a foot and being resiliently urged by a biasing force into spaced apart relation and displaceable relative to each other against such biasing force, and a female element provided with a longitudinally extending opening and provided also with a pair of surfaces extending generally lengthwise of said opening, said surfaces being adapted to have the legs of said male element respectively move therealong and being oriented relative to each other so as to displace said legs laterally against such biasing force, one of said surfaces having a notch therealong adapted to seat one of said legs therein, said notch being off-set laterally from the general line of said one surface in a direction in which such biasing force urges said one leg thereinto, the other of said surfaces having a recess therealong adapted to seat the other of said legs therein at the same time that said leg is seated within said notch, such resilient biasing force being operative upon movement of said legs along said surfaces to cause said one leg to resiliently snap into said notch and said other leg to enter said recess and thereby releasably interlock said male and female elements against relative longitudinal displacements, and restraining wall structure overlying that portion of said opening receiving said foot therein when said elements are in the interlocked condition thereof so as to prevent displacement of said male element in a direction toward such restraining wall structure, said male element being removable from such condition of interlock by the application of a torque thereto tending to rotate the same about the longitudinal axis of the other of said legs while in said recess and thereby displace said one leg from said notch, said notch being the only notch provided by said female element and cooperative with said male element to establish a releasable interlock therebetween.

6. A detachable fastener comprising: a male element having a pair of legs at least one of which terminates in an angularly extending free end portion defining a foot and being resiliently urged by a biasing force into spaced apart relation and displaceable relative to each other against such biasing force, and a female element provided with a longitudinally extending opening and provided also with a pair of surfaces extending generally lengthwise of said opening, said surfaces being adapted to have the legs of said male element respectively move therealong and being oriented relative to each other so as to displace said legs laterally against such biasing force, one of said surfaces having a notch therealong adapted to seat one of said legs therein, said notch being off-set laterally from the general line of said one surface in a direction in which such biasing force urges said one leg thereinto, the other of said surfaces having a recess therealong adapted to seat the other of said legs therein at the same time that said one leg is seated within said notch and being off-set laterally from the general line of the associated surface in a direction in which such biasing force urges said other leg thereinto, said other surface also being provided with a cam configuration therealong defining the mergence thereof with said recess and which cam configuration is traversed by said other leg in moving into said recess and tends to maintain such other leg therein, and restraining wall structure overlying that portion of said opening receiving said foot therein when said elements are in the interlocked condition thereof so as to prevent displacement of said male element in a direction generally toward such restraining wall structure, the resilient biasing force being operative upon movement of said legs along said surfaces to cause said one leg to resiliently snap into said notch and thereby releasably interlock said male and female elements against relative longitudinal displacements, said male element being removable from such condition of interlock by application of a torque thereto tending to rotate the same about the longitudinal axis of the aforesaid other leg and thereby displace said one leg from said notch.

7. The detachable fastener of claim 6 in which said surfaces are spaced from each other laterally, and in which said female element has a longitudinally extending tongue located intermediate said surfaces and providing edge portions respectively facing the same, each surface together with the associated facing edge portion defining a channel therebetween through which a leg of said male element is movable, said channels having enlarged mouths defining the entrances thereto and being closed at their inner ends and respectively providing thereat the associated notch and recess.

8. The detachable fastener of claim 6 in which said surfaces are spaced from each other laterally, in which said legs are inwardly displaceable toward each other against the biasing force operative thereon, and in which said notch and recess are disposed laterally outwardly from the respectively associated surfaces, said surfaces being oriented to displace said legs toward each other upon movement thereof through the respective channels inwardly from the entrances thereof.

9. A detachable fastener comprising: a male element having a pair of legs terminating in forwardly extending free end portions and being resiliently urged by a biasing force into spaced apart relation and displaceable laterally inwardly toward each other against such biasing force, and a female element having outer and inner walls defining a longitudinally extending opening therebetween, said inner wall being provided with a pair of laterally spaced channels extending generally lengthwise of said opening and having enlarged mouths defining the entrances thereto, said channels being closed at their inner terminal ends and being defined in part by respectively associated laterally outer surfaces provided by said inner wall and adapted to have the legs of said male element respectively move therealong, said surfaces being oriented relative to each other so as to displace said legs toward each other against such biasing force upon movement of said male element through said channels from the entrances thereof toward said terminal ends, one of said surfaces having adjacent the closed terminal end of the associated channel a notch adapted to seat one of said legs therein, said notch being off-set laterally outwardly from the general line of said one surface so that such biasing force urges said one leg thereinto, the other of said surfaces having adjacent the closed terminal end of the associated channel a recess adapted to seat the other of said legs therein and being off-set laterally outwardly from the general line of the associated surface so that such biasing force urges said other leg thereinto, said other surface also being provided with a cam configuration therealong defining the mergence thereof with said recess, and said opening comprising both a main body part substantially underlying said channels and a pair of passages opening into said main body part and extending longitudinally forwardly therefrom for receipt of the free end portions of said legs therein whereby said outer and inner walls respectively underlying and overlying such free end portions thereby constrain said male element against displacements in directions toward and away from the general plane of said inner wall, the resilient biasing force operative between said legs being effective upon movement thereof through the respective channels and along the associated surfaces to cause said one leg to resiliently snap into said notch and the other of said legs to seat within said recess to releasably interlock said male and female elements against relative longitudinal displacements, said male element being removable from such condition of interlock upon application of a torque thereto tending to rotate the same about the longitudinal axis of the aforesaid other leg and thereby displace said one leg from said notch, whereupon an outwardly directed longitudinal force then applied to said male element is effective to withdraw the same through said channels.

10. The detachable fastener of claim 9 in which the wall portions defining the lateral extremities of said opening are spaced outwardly beyond the lateral limits of said channels to provide a large space through which said free end portions of said legs are movable to thereby facilitate interconnection of said male and female elements.

11. The detachable fastener of claim 10 in which said male element is provided with a base member at one end thereof integrally interconnecting said legs, said base member defining a mounting structure for securing said male element thereat to another component.

12. The detachable fastener of claim 10 in which said female element comprises two separate segments respectively defining said channels and associated components of said female element.

13. A detachable fastener comprising: a male element having a pair of legs resiliently urged by a biasing force into spaced apart relation and being displaceable relative to each other against such biasing force, and a female element provided with a longitudinally extending opening and provided also with a pair of surfaces extending generally lengthwise of said opening, said surfaces being adapted to have the legs of said male element respectively move therealong and being oriented relative to each other so as to displace said legs laterally against such biasing force, one of said surfaces having a notch therealong adapted to seat one of said legs therein said notch being off-set laterally from the general line of said one surface in a direction in which such biasing force urges said one leg thereinto, the other of said surfaces having a recess therealong adapted to seat the other of said legs therein and being off-set laterally from the general line of the associated surface in a direction in which such biasing force urges said other leg thereinto, said other surface also being provided with a cam configuration therealong defining the mergence thereof with said recess, the aforementioned resilient biasing force being operative upon movement of said legs along said surfaces to cause said one leg to resiliently snap into said notch and thereby releasably interlock said male and female elements against relative longitudinal displacements, said male element being removable from such condition of interlock by application of a torque thereto tending to rotate the same about the longitudinal axis of the aforesaid other leg and thereby displace said one leg from said notch, said surfaces being spaced from each other laterally and said female element having intermediate said surfaces a longitudinally extending tongue providing edge portions respectively facing the surfaces, each surface together with the associated facing edge portion defining a channel therebetween through which a leg of said male element is movable, said channels having enlarged mouths defining the entrances thereto and being closed at their inner terminal ends and respectively providing thereat the associated notch and recess, said legs being inwardly displaceable toward each other against the biasing force operative thereon, said notch and recess being disposed laterally outwardly from the respectively associated surfaces, which are oriented to displace said legs toward each other upon movement thereof through the respective channels from the entrances thereof toward the terminal ends.

14. A detachable fastener comprising: a male element having a pair of legs at least one of which terminates in an angularly extending free end portion defining a foot and being resiliently urged by a biasing force into spaced apart relation and displaceable relative to each other against such biasing force, and a female element provided with a longitudinally extending opening and provided also with a pair of surfaces extending generally lengthwise of said opening, said surfaces being adapted to have the legs of said male element respectively move therealong and being oriented relative to each other so as to displace said legs laterally against such biasing force, one of said surfaces having a notch therealong adapted to seat one of said legs therein, said notch being off-set laterally from the general line of said one surface in a direction in which such biasing force urges said one leg thereinto, the other of said surfaces having a recess therealong adapted to seat the other of said legs therein and being off-set laterally from the general line of the associated surface in a direction in which such biasing force urges said other leg thereinto, said other surface also being provided with a cam configuration therealong defining the mergence thereof with said recess, and restraining wall structure overlying that portion of said opening receiving said foot therein when said elements are in the interlocked condition thereof so as to prevent displacement of said male element in a direction generally toward such restraining wall structure, the resilient biasing force being operative upon movement of said legs along said surfaces to cause said one leg to snap resiliently into said notch and thereby releasably interlock said male and female elements against relative longitudinal displacements, said male element being removable from such condition of interlock by application of a torque thereto tending to rotate the same about the longitudinal axis of the aforesaid other leg and thereby displace said one leg from said notch, said surfaces being spaced from each other laterally and said female element having intermediate said surfaces a longitudinally extending tongue providing edge portions respectively facing the surfaces, each surface together with the associated facing edge portion defining a channel therebetween through which a leg of said male element is movable, said channels having enlarged mouths defining the entrances thereto and being closed at their inner terminal ends and respectively providing thereat the associated notch and recess, said legs being inwardly displaceable toward each other against the biasing force operative thereon, said notch and recess being disposed laterally outwardly from the respectively associated surfaces, which are oriented to displace said legs toward each other upon movement thereof through the respective channels from the entrances thereof toward the terminal ends.

References Cited by the Examiner

UNITED STATES PATENTS

| 1,846,990 | 2/1932 | Calkins | 24—237 |
| 1,904,315 | 4/1933 | Kenway | 248—62 |
| 2,623,989 | 12/1952 | Lehmann | 240—151 |

FOREIGN PATENTS

| 77.633 | 10/1894 | Germany. |
| 813,282 | 9/1951 | Germany. |

WILLIAM FELDMAN, *Primary Examiner.*

E. SIMONSEN, *Assistant Examiner.*